US011407592B2

(12) United States Patent
Zhang et al.

(10) Patent No.: US 11,407,592 B2
(45) Date of Patent: Aug. 9, 2022

(54) ELECTRODE SHEET TURNING MECHANISM

(71) Applicant: GUANGZHOU SUPERSONIC AUTOMATION TECHNOLOGY CO., LTD., Guangzhou (CN)

(72) Inventors: Junfeng Zhang, Guangzhou (CN); Changchun Ye, Guangzhou (CN); Jiafu Huang, Guangzhou (CN)

(73) Assignee: GUANGZHOU SUPERSONIC AUTOMATION TECHNOLOGY CO., LTD., Guangzhou (CN)

( * ) Notice: Subject to any disclaimer, the term of this patent is extended or adjusted under 35 U.S.C. 154(b) by 0 days.

(21) Appl. No.: 16/991,068

(22) Filed: Aug. 12, 2020

(65) Prior Publication Data

US 2020/0369478 A1 Nov. 26, 2020

Related U.S. Application Data

(63) Continuation of application No. PCT/CN2019/072777, filed on Jan. 23, 2019.

(30) Foreign Application Priority Data

Nov. 30, 2018 (CN) .......................... 201822007745.7

(51) Int. Cl.
*B65G 47/24* (2006.01)
*B65G 21/20* (2006.01)
(Continued)

(52) U.S. Cl.
CPC ....... *B65G 21/2036* (2013.01); *B65G 47/252* (2013.01); *B65G 47/91* (2013.01); *B65H 15/008* (2020.08)

(58) Field of Classification Search
CPC ..... B65G 47/252; B65G 47/91; B65H 15/008
See application file for complete search history.

(56) References Cited

U.S. PATENT DOCUMENTS 3,474,712 A * 10/1969 Pino ........................ B31B 70/56
493/444
5,326,219 A * 7/1994 Pippin .................. B65G 1/1376
186/52
(Continued)

FOREIGN PATENT DOCUMENTS

CN 101400590 A 4/2009
CN 203119026 U 8/2013
(Continued)

OTHER PUBLICATIONS

International Search Report issued in corresponding International application No. PCT/CN2019/072777, dated Sep. 5, 2019.
(Continued)

*Primary Examiner* — Lynn E Schwenning

(57) ABSTRACT

An electrode sheet turning mechanism includes a housing, a conveyor belt, a driver, and a stripper. The housing has a suction cavity, and forms an arc-shaped guide surface. A material feeding region and a material discharging region are formed on the arc-shaped guide surface, which is further provided with first suction holes. Second suction holes run through the conveyor belt. The conveyor belt is wound on the arc-shaped guide surface, and seals the first suction holes. The driver is for driving the conveyor belt to move. The stripper is for extending to the position between the conveyor belt and the electrode sheet. In the present utility model, the electrode sheet can be automatically turned.

8 Claims, 7 Drawing Sheets

(51) Int. Cl.
   *B65H 15/00*   (2006.01)
   *B65G 47/252*  (2006.01)
   *B65G 47/91*   (2006.01)

(56) References Cited

U.S. PATENT DOCUMENTS

| | | | | |
|---|---|---|---|---|
| 5,601,397 | A * | 2/1997 | Lopez | A21C 9/086 |
| | | | | 198/431 |
| 6,957,944 | B2 * | 10/2005 | Sisk | B65G 47/252 |
| | | | | 414/798.5 |
| 9,873,975 | B2 * | 1/2018 | Nielsen | D06F 67/04 |
| 2003/0082044 | A1 * | 5/2003 | Gendron | B65H 31/06 |
| | | | | 414/789.9 |
| 2005/0077150 | A1 * | 4/2005 | Dickinson | B65G 47/252 |
| | | | | 198/603 |
| 2009/0066015 | A1 | 3/2009 | Sugiyama et al. | |

FOREIGN PATENT DOCUMENTS

| | | | | |
|---|---|---|---|---|
| CN | 103662169 | A | | 3/2014 |
| CN | 103964235 | A | | 8/2014 |
| CN | 105752681 | | * | 7/2016 |
| CN | 105752681 | A | | 7/2016 |
| CN | 106005976 | A | | 10/2016 |
| CN | 108341263 | A | | 7/2018 |
| JP | S6061455 | A | | 4/1985 |
| JP | 2004224565 | A | | 8/2004 |
| WO | WO 2008/067801 | | * | 6/2008 ............ B23B 17/10 |

OTHER PUBLICATIONS

Written Opinion of the International Searching Authority for No. PCT/CN2019/072777.

* cited by examiner

ELECTRODE SHEET TURNING MECHANISM

CROSS REFERENCE OF RELATED APPLICATIONS

The present application is a continuation-application of International (PCT) Patent Application No. PCT/CN2019/072777, titled "ELECTRODE SHEET TURNING MECHANISM", filed on Jan. 23, 2019, which claims foreign priorities of Chinese Patent Application No. 201822007745.7, titled "ELECTRODE SHEET TURNING MECHANISM", filed on Nov. 30, 2018, the entire contents of which are hereby incorporated by reference.

TECHNICAL FIELD

The present utility model relates to a turning mechanism, and in particular, to an electrode sheet turning mechanism.

BACKGROUND

Currently, in an electrode sheet production process, structures on both sides of an electrode sheet need to be photographed and detected, to determine whether the electrode sheet is qualified. However, an existing electrode sheet detection apparatus can perform detection on only one side of an electrode sheet. Consequently, after detection is performed on one side, the electrode sheet generally needs to be manually turned for detection on the other side. When a detection amount is large, this manual turning manner easily causes fatigue in operations, affecting working efficiency.

SUMMARY

To overcome the disadvantage of the existing technology, an objective of the present utility model is to provide an electrode sheet turning mechanism that can automatically turn an electrode sheet to improve efficiency.

The present utility model is implemented by using the following technical solution:

An electrode sheet turning mechanism includes a frame, a housing, a conveyor belt, a driver, a stripper, and a gas pump. The housing is mounted on the frame, and has a suction cavity. An arc-shaped guide surface is formed on the housing. In the extension direction of the arc-shaped guide surface, a material feeding region is formed on the upper side of the arc-shaped guide surface, and a material discharging region is formed on the lower side of the arc-shaped guide surface. Multiple first suction holes disposed in a staggered manner are provided on the arc-shaped guide surface. The first suction holes communicate with the suction cavity and the exterior. The gas pump is for drawing a gas in the suction cavity. The conveyor belt is for conveying an electrode sheet, and multiple second suction holes disposed in a staggered manner run through the conveyor belt. The conveyor belt is further wound on the arc-shaped guide surface, and seals the first suction holes. The driver is for driving the conveyor belt to move in the extension direction of the arc-shaped guide surface. When the electrode sheet moves along with the conveyor belt to the material discharging region, the stripper is for extending to the position between the conveyor belt and the electrode sheet.

Further, multiple plate stiffeners are fixed in the suction cavity.

Further, a longitudinal section of the arc-shaped guide surface is semicircular.

Further, multiple electrode sheet placement areas successively spaced and arranged in the extension direction of the conveyor belt are formed on the conveyor belt, and the second suction holes are disposed on the electrode sheet placement areas.

Further, the conveyor belt is a toothed conveyor belt. The driver includes a first conveying roller, a second conveying roller, and a rotary motor. The first conveying roller and the second conveying roller each are pivotally connected to the frame. A drive gear is fixed on the second conveying roller. The toothed conveyor belt is wound on the first conveying roller and the drive gear, and meshes with the drive gear. An output shaft of the rotary motor is connected to the second conveying roller through transmission.

Further, the electrode sheet turning mechanism further includes a tension wheel assembly for tensioning the toothed conveyor belt.

Further, there are multiple such toothed conveyor belts, and the multiple toothed conveyor belts are successively arranged in the length direction of the first conveying roller. Multiple such drive gears are fixed on the second conveying roller, and the multiple drive gears are disposed in a one-to-one correspondence with the multiple toothed conveyor belts.

Further, the stripper is fixed on the arc-shaped guide surface, and extends in the extension direction of the arc-shaped guide surface.

Further, the height, of the stripper, protruding from the arc-shaped guide surface progressively increases from one end near the material feeding region to the other end of the stripper.

Compared with the existing technology, the present utility model has the following beneficial effect.

In the present utility model, the first suction holes and the second suction holes are disposed. As such, the electrode sheet can be sucked onto the conveyor belt by the gas pump by drawing a gas in the suction cavity. Subsequently, driven by the driver, the electrode sheet moves in an arc along with the conveyor belt, and the orientation of the electrode sheet is adjusted. After the stripper extends to the position between the conveyor belt and the electrode sheet, the electrode sheet is free from the suction of the suction cavity and can be stripped from the conveyor belt. Afterwards, the electrode sheet falls down on the side backing onto the conveyor belt under action of the gravity of the electrode sheet, thereby turning the electrode sheet.

In the figures: 10: housing; 11: suction cavity; 12: arc-shaped guide surface; 121: first suction hole; 20: conveyor belt; 21: second suction hole; 30: driver; 31: first conveying roller; 32: second conveying roller; 33: drive gear; 34: rotary motor; 40: stripper; 50: tension wheel assembly; 60: frame; 70: gas pump.

DESCRIPTION OF EMBODIMENTS

The following further describes the present utility model with reference to the accompanying drawings and specific implementations. It should be noted that, the embodiments or technical features described below can be randomly combined to form new embodiments, provided that there is no conflict.

Figure 1:
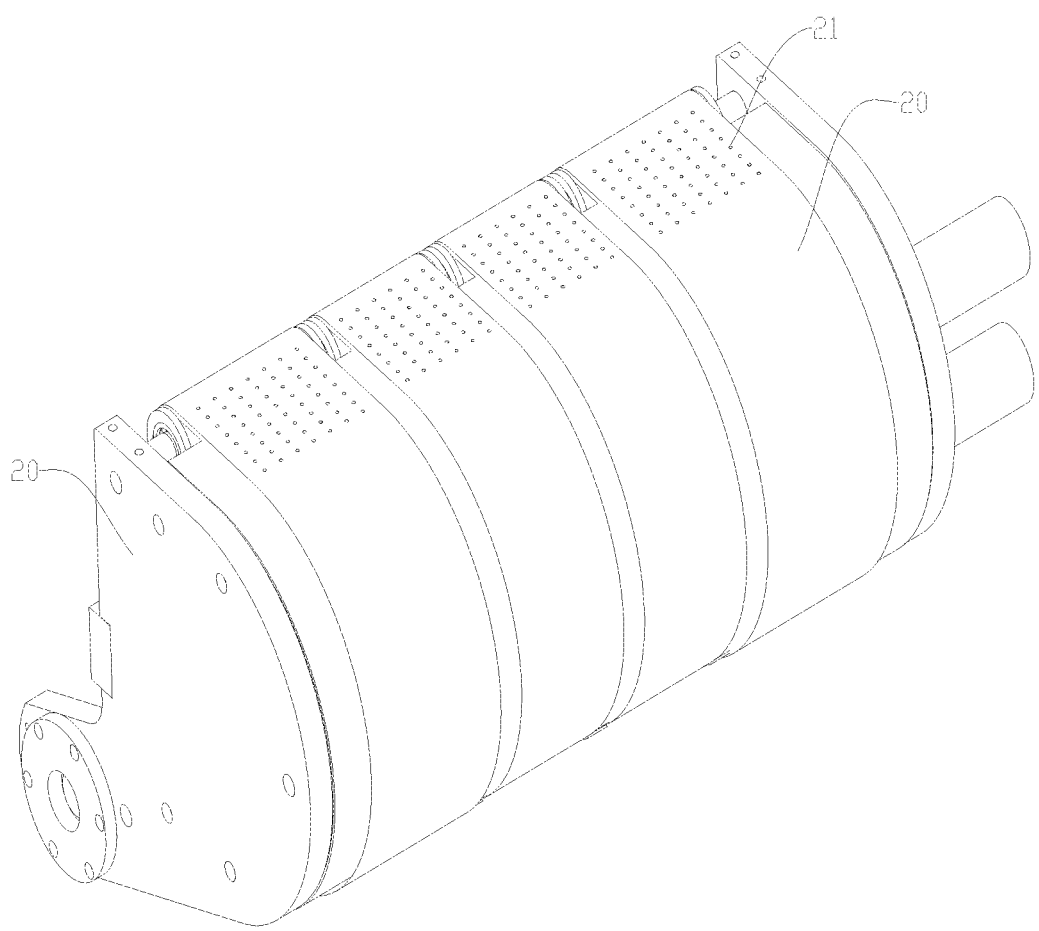
FIG. 1 is a schematic diagram 1 of an overall structure of an electrode sheet turning mechanism according to the present utility model.
Figure 2:
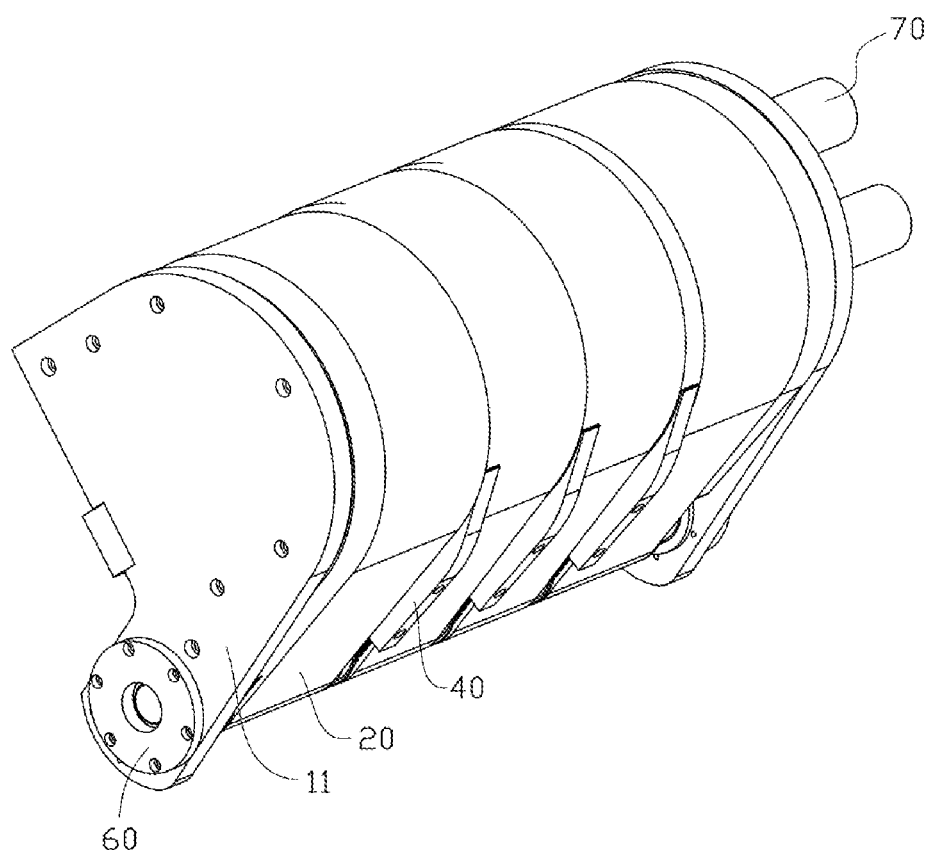
FIG. 2 is a schematic diagram 2 of an overall structure of an electrode sheet turning mechanism according to the present utility model.
Figure 3:
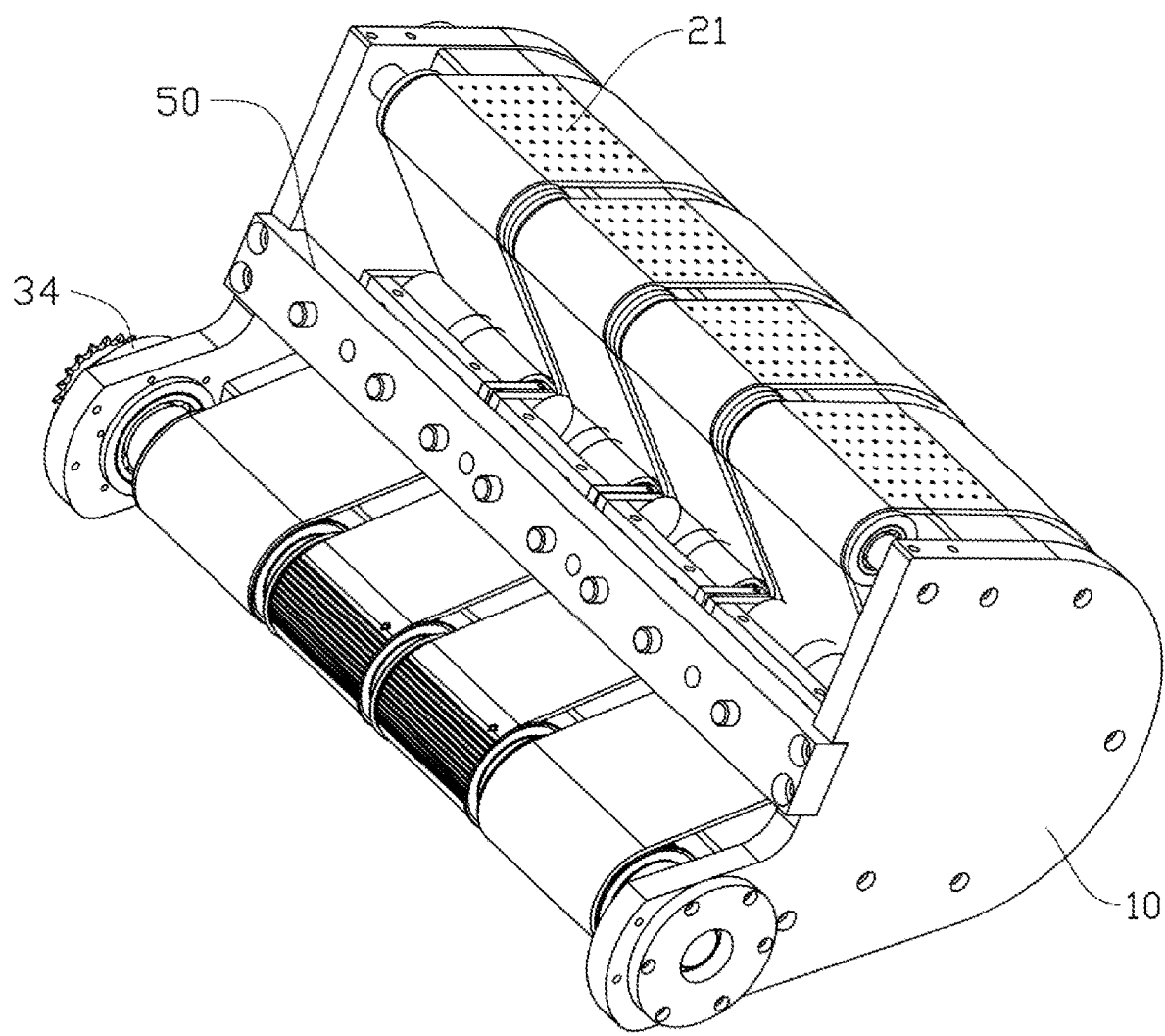
FIG. 3 is a schematic diagram 3 of an overall structure of an electrode sheet turning mechanism according to the present utility model.
Figure 4:
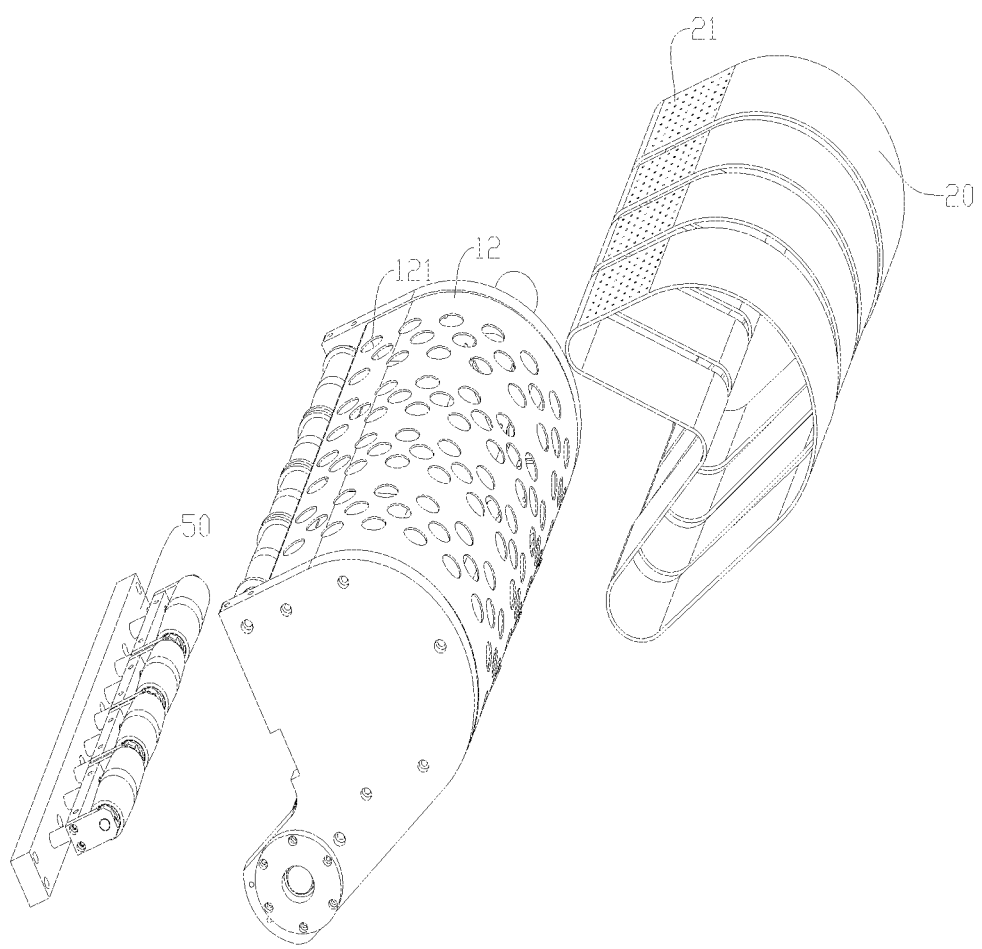
FIG. 4 is an exploded diagram 1 of an electrode sheet turning mechanism according to the present utility model.
Figure 5:
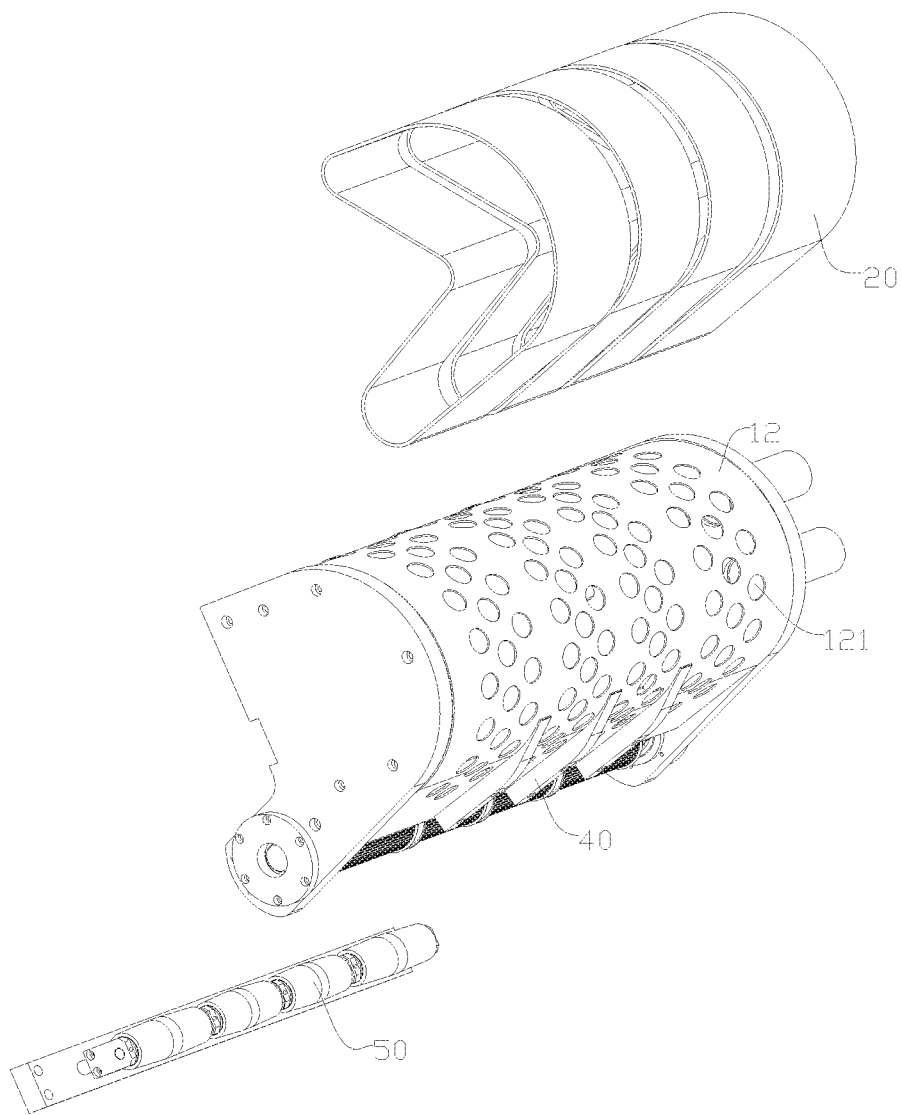
FIG. 5 is an exploded diagram 2 of an electrode sheet turning mechanism according to the present utility model.
Figure 6:
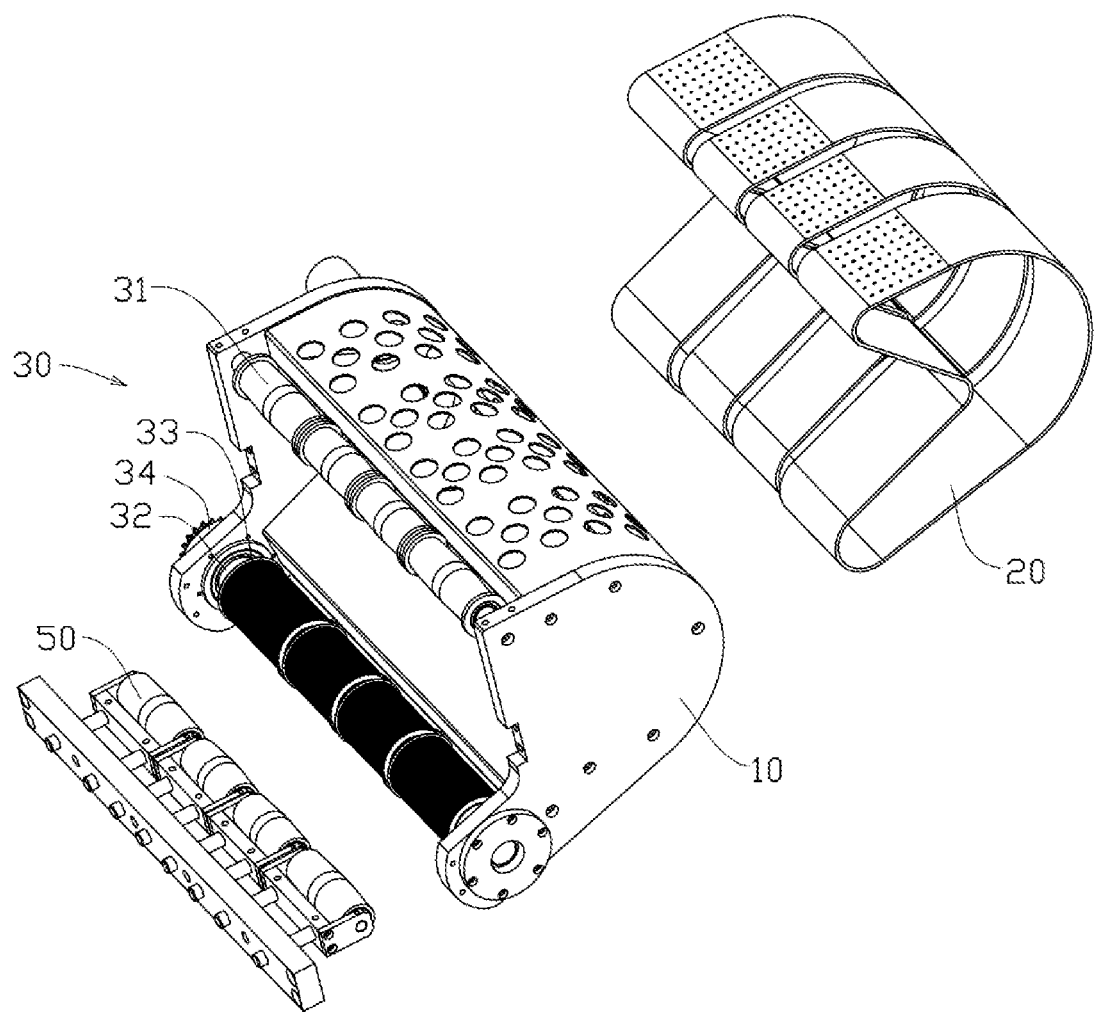
FIG. 6 is an exploded diagram 3 of an electrode sheet turning mechanism according to the present utility model.
Figure 7:
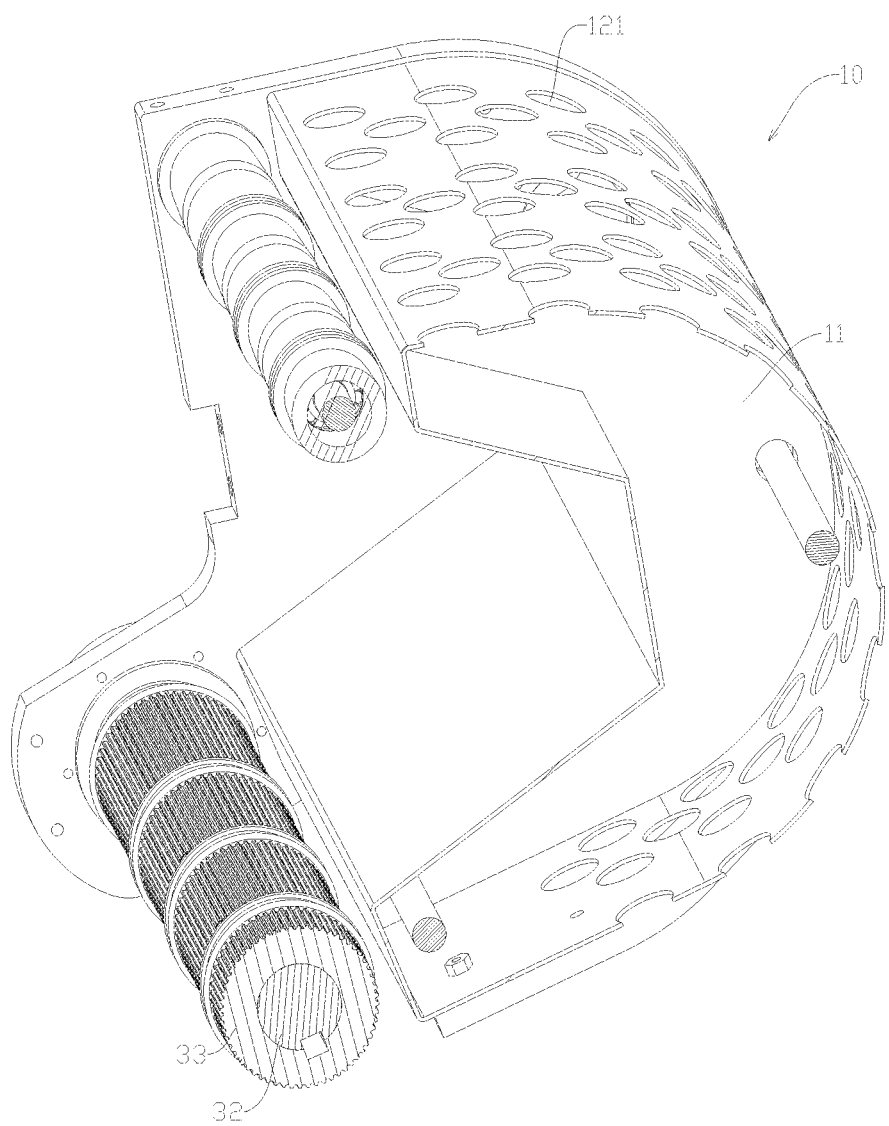
FIG. 7 is a cutaway drawing of a housing according to the present utility model.

An electrode sheet turning mechanism shown in FIG. 1 to FIG. 7 includes a frame 60, a housing 10, a conveyor belt 20, a driver 30, a stripper 40, and a gas pump 70. The housing 10 is mounted on the frame 60, and has a suction cavity 11. An arc-shaped guide surface 12 is formed on the housing 10. In the extension direction of the arc-shaped guide surface 12, a material feeding region is formed on the upper side of the arc-shaped guide surface 12, and a material discharging region is formed on the lower side of the arc-shaped guide surface 12. Multiple first suction holes 121 disposed in a staggered manner are provided on the arc-shaped guide surface 12. The first suction holes 121 communicate with the suction cavity 11 and the exterior. The gas pump 70 is for drawing a gas in the suction cavity 11. The conveyor belt 20 is for conveying an electrode sheet, and multiple second suction holes 21 disposed in a staggered manner run through the conveyor belt 20. The conveyor belt 20 is further wound on the arc-shaped guide surface 12, and seals the first suction holes 121. The driver 30 is for driving the conveyor belt 20 to move in the extension direction of the arc-shaped guide surface 12. When the electrode sheet moves along with the conveyor belt 20 to the material discharging region, the stripper 40 is for extending to the position between the conveyor belt 20 and the electrode sheet.

Based on the previous structure, when the electrode sheet turning mechanism is used, the electrode sheet is placed on the conveyor belt 20 and is disposed by sealing the second suction holes 21. In this case, the conveyor belt 20 seals the first suction holes 121 and the electrode sheet seals the second suction holes 21. The gas pump 70 draws the gas in the suction cavity 11, and the pressure inside the suction cavity 11 is lower than the external pressure, so that the electrode sheet is sucked onto the conveyor belt 20. Afterwards, the driver 30 drives the conveyor belt 20 to move in the direction from the material feeding region to the material discharging region. The electrode sheet moves along with the conveyor belt 20 in the extension direction of the arc-shaped guide surface 12, and the orientation of the electrode sheet is adjusted. When the electrode sheet moves along with the conveyor belt 20 to the material discharging region, the stripper 40 extends to the position between the conveyor belt 20 and the electrode sheet, and keeps extending between the conveyor belt 20 and the electrode sheet as the driver 30 continuously drives the conveyor belt 20. The stripper 40 keeps the electrode sheet away from the conveyor belt 20, that is, enables the electrode sheet to overcome the suction of the suction cavity 11 and be stripped from the conveyor belt 20. Then, the electrode sheet falls down on the side backing onto the conveyor belt 20 under action of the gravity of the electrode sheet, to complete automatic turning of the electrode sheet, thereby reducing labor intensity and improving efficiency.

It should be noted herein that, in practice, the pore size of the second suction holes 21 is less than the pore size of the first suction holes 121. Therefore, the larger pore size of the first suction holes 121 can ensure action of the suction cavity 11 on the conveyor belt 20 when the gas pump 70 draws the gas in the suction cavity 11, and the smaller pore size of the second suction holes 21 can control the speed of entering the suction cavity 11 by an external gas when the electrode sheet is stripped from the conveyor belt 20, thereby ensuring suction action of the suction cavity 11.

To improve the strength of the housing 10, preferably, multiple plate stiffeners are fixed in the suction cavity 11. In actual mounting, the stiffeners are fixedly connected to the cavity wall of the suction cavity 11. Moreover, the stiffeners are disposed in the suction cavity 11, so that idle space in the suction cavity 11 can be reduced, and drawing of the air from the suction cavity 11 by the gas pump 70 can be further accelerated, thereby improving efficiency.

Specifically, a longitudinal section of the arc-shaped guide surface 12 is semicircular.

Further, multiple electrode sheet placement areas successively spaced and arranged in the extension direction of the conveyor belt 20 are formed on the conveyor belt 20, and the second suction holes 21 are disposed on the electrode sheet placement areas. In this way, electrode sheets can be arranged in order, and the stripper 40 can strip the electrode sheets from the conveyor belt 20 in order, thereby avoiding an overlap between the electrode sheets.

Specifically, the conveyor belt 20 is a toothed conveyor belt 20. The driver 30 includes a first conveying roller 31, a second conveying roller 32, and a rotary motor 34. The first conveying roller 31 and the second conveying roller 32 each are pivotally connected to the frame 60. A drive gear 33 is fixed on the second conveying roller 32. The toothed conveyor belt 20 is wound on the first conveying roller 31 and the drive gear 33, and meshes with the drive gear 33. An output shaft of the rotary motor 34 is connected to the second conveying roller 32 through transmission. In this way, the rotary motor 34 drives the second conveying roller 32 to rotate, and the second conveying roller 32 drives, by linkage, the drive gear 33 to rotate. In this case, the toothed conveyor belt 20 moves under action of the drive gear 33.

More specifically, the electrode sheet turning mechanism further includes a tension wheel assembly 50 for tensioning the toothed conveyor belt 20, to ensure that the toothed conveyor belt 20 is pressed closely against the arc-shaped guide surface 12. The tension wheel assembly 50 can use the following structure: The tension wheel assembly 50 includes a bracket fixed on the frame 60 and a tension wheel pivotally connected to the bracket, and the tension wheel rolls to fit the surface of the toothed conveyor belt 20.

Further, there are multiple such toothed conveyor belts 20, and the multiple toothed conveyor belts 20 are successively arranged in the length direction of the first conveying roller 31. Multiple such drive gears 33 are fixed on the second conveying roller 32, and the multiple drive gears 33 are disposed in a one-to-one correspondence with the multiple toothed conveyor belts 20.

The stripper 40 is fixed on the arc-shaped guide surface 12, and extends in the extension direction of the arc-shaped guide surface 12.

Specifically, the height, of the stripper 40, protruding from the arc-shaped guide surface 12 progressively increases from one end near the material feeding region to the other end of the stripper 40. In this way, the end with a smaller height ensures that the stripper 40 smoothly extends into the position between the electrode sheet and the conveyor belt 20. However, increasing the height progressively can enlarge the distance between the electrode sheet and the conveyor belt 20, thereby ensuring that the electrode sheet can be free from the suction of the suction cavity 11.

The previous stripper 40 can be a stripping block, a stripping plate, or a stripping sheet.

The previous implementations are merely example implementations of the present utility model, and are not intended to limit the protection scope of the present utility model. Any non-substantial change and replacement made by a person skilled in the art on the basis of the present utility model falls within the protection scope claimed by the present utility model.

What is claimed is:

1. An electrode sheet turning mechanism, comprising a frame, a housing, a conveyor belt, a driver, a stripper, and a gas pump; wherein the housing is mounted on the frame, and has a suction cavity; an arc-shaped guide surface is formed on the housing; in an extension direction of the arc-shaped guide surface, a material feeding region is formed on an upper side of the arc-shaped guide surface, and a material discharging region is formed on a lower side of the arc-shaped guide surface; a plurality of first suction holes disposed in a staggered manner are provided on the arc-shaped guide surface; the first suction holes communicate with the suction cavity and an exterior; the gas pump is configured for drawing a gas in the suction cavity; the conveyor belt is configured for conveying an electrode sheet, and a plurality of second suction holes disposed in a staggered manner run through the conveyor belt; the conveyor belt is further tightly wound on the arc-shaped guide surface, and is operative to seal the first suction holes; the driver is configured for driving the conveyor belt to move in the extension direction of the arc-shaped guide surface; and when the electrode sheet passes through the material discharging region along with the conveyor belt, the stripper is configured for guiding the electrode sheet to move in a direction away from the conveyor belt, so that the electrode sheet is stripped away from the conveyor belt;

wherein the conveyor belt is wrapped around the housing and rotatable around the housing when driven by the driver;

wherein pore size of the second suction holes is smaller than pore size of the first suction holes.

2. The electrode sheet turning mechanism according to claim 1, wherein a longitudinal section of the arc-shaped guide surface is semicircular.

3. The electrode sheet turning mechanism according to claim 1, wherein a plurality of electrode sheet placement areas successively spaced and arranged side by side in the extension direction of the conveyor belt are formed on the conveyor belt, and the second suction holes are defined in the electrode sheet placement areas.

4. The electrode sheet turning mechanism according to claim 1, wherein the conveyor belt is a toothed conveyor belt; the driver comprises a first conveying roller, a second conveying roller, and a rotary motor; the first conveying roller and the second conveying roller each are pivotally connected to the frame; a drive gear is fixed to the second conveying roller; the toothed conveyor belt is wound on the first conveying roller and the drive gear, and meshes with the drive gear; and an output shaft of the rotary motor is in transmission connection with the second conveying roller.

5. The electrode sheet turning mechanism according to claim 4, further comprising a tension wheel assembly configured for tensioning the toothed conveyor belt.

6. The electrode sheet turning mechanism according to claim 5, wherein there are a plurality of such toothed conveyor belts, which are successively arranged in a lengthwise direction of the first conveying roller; and a plurality of such drive gears are fixed to the second conveying roller, and the plurality of drive gears are disposed in a one-to-one correspondence with the plurality of toothed conveyor belts.

7. The electrode sheet turning mechanism according to claim 1, wherein the stripper is fixed to the arc-shaped guide surface, and extends in the extension direction of the arc-shaped guide surface.

8. The electrode sheet turning mechanism according to claim 7, wherein a height, of the stripper, protruding from the arc-shaped guide surface progressively increases from one end near the material feeding region to the other end of the stripper.

* * * * *